United States Patent [19]

Brady

[11] 3,755,241
[45] Aug. 28, 1973

[54] POTTING COMPOUND AND METHOD OF POTTING
[75] Inventor: Thomas G. Brady, Oneonta, N.Y.
[73] Assignee: The Bendix Corporation, Sidney, N.Y.
[22] Filed: June 30, 1971
[21] Appl. No.: 158,606

Related U.S. Application Data
[63] Continuation-in-part of Ser. No. 850,632, Aug. 15, 1969, abandoned.

[52] U.S. Cl..... 260/33.6 UB, 260/37 N, 260/859 R, 264/272, 260/41.5 R
[51] Int. Cl........................ C08g 51/14, C08g 51/28
[58] Field of Search ..................... 260/859, 33.6 UB

[56] References Cited
UNITED STATES PATENTS

| | | | |
|---|---|---|---|
| 3,637,558 | 1/1972 | Verdol | 260/28 |
| 3,358,052 | 12/1967 | Archer | 260/859 |
| 3,427,366 | 2/1969 | Verdol | 260/5 |
| 3,283,036 | 11/1966 | Larson | 260/897 |

OTHER PUBLICATIONS
Ser. No. 465,161, p. 1–20, 25–31 (mentioned in U.S. Patent No. 3,637,558)

Damusis, "Sealants," Reinhold Pub., New York, 1967, pages 164–165.
Meals & Lewis, "Silicones," Reinhold, New York, 1959, pages 192–197
Sinclair, "Product Data Bulletin No. 505, Poly B–D Liquid Resins," 1965, pages cover and 1.

*Primary Examiner*—Morris Liebman
*Assistant Examiner*—P. R. Michl
*Attorney*—Raymond J. Eixler and William S. Thompson

[57] ABSTRACT

A potting compound is used to embed delicate or coordinated instruments within a casing to protect them from shock or vibration which would destroy them or derange them. The essential ingredients of the potting compound are dihydroxypolybutadiene, an extender oil, a microfine polypropylene powder, and an organic diisocyanate. The resulting compound is presumed to have an oil-modified polyurethane structure as a matrix enclosing the polypropylene powder as an integrated, dispersed phase. The compound has high adhesion to practically everything used in potting, requires no interlayer, is flexible at −65° F. and is heat resistant for short periods at 260° F.

10 Claims, No Drawings

POTTING COMPOUND AND METHOD OF POTTING

This application is a continuation in part of Ser. No. 850,632, filed Aug. 15, 1969 and now abandoned, and is entitled to its priority.

This invention relates to potting compounds. Potting compounds are shock-proof beds for delicate or coordinated instruments. Their function is to furnish a protective support for objects which may be destroyed, dismantled, or deranged by vibration or shock. An example of such is a blaster. A blaster is a capacitor discharge apparatus for generating blasting current. The blaster shell contains electrical components such as capacitors; the potting is done by mounting the electrical components in the shell and enclosing them by filling the shell with a fluid potting compound, which is cured at room temperature or by heat, according to composition, after the potting has been compositions of this invention, and a cure at room temperature for another. Our heat-cured potting compound will cure by itself at room temperature if left to stand long enough, but cures faster at elevated temperature. Our new compounds will not revert to liquid, as some prior potting compounds do.

Previous compounds required that the pot be coated with an adhesive such as rubber, to make the potting compound adhere to the shell or container but in our invention the shell can be made of any material of sufficient strength, e.g., concrete, steel, or plastic and requires no adhesive coat, as the new potting compounds adhere very well to all such materials.

Among potting compounds there are several desiderata, important among which are low density to make them light, fineness to enable large quantities to be incorporated, compatibility with the potted objects, high elongation, flexibility at all working temperatures, particularly below zero, and resistance to disintegration at elevated temperatures. There are large numbers of resinous compounds which might be tried in such compositions but only a few have been discovered which are reasonably satisfactory.

The major object of the present invention is to present to industry a group of potting compounds which meet all these requirements and which have superior qualities in some of them, particularly that certain of them can be cured rapidly and satisfactorily at room temperature.

The objects are accomplished, generally speaking by a group of potting compounds having the composition: (1) hydroxy-terminated homopolymeric polybutadiene having two terminal hydroxy groups. This material is not adequate in itself. (2) Extender oil. This material is insufficient in itself but is essential to the invention. The extender oils, herein so called, are true oils, for instance paraffinic, cycloparaffinic, aliphatic, cycloaliphatic, aromatic oils which form solutions with the polybutadiene of our invention, and of which mineral oils lighter than kerosene fractions are generally indicated, naphthenic and paraffinic oils being preferred. Naphthenic type oils and paraffinic type oils, and combined naphthenic-paraffinic oils are given as a preferred mode without detracting from the general usefulness of mineral oils lighter than kerosene. The viscosity of one of the best of these oils at 100° F. is 180 (sus), and at 210° F., 42. Its specific gravity 60/60 is .09024. It has a flash point COC of 340 and carbon analysis shows aromatic hydrocarbons 0%, naphthenic hydrocarbons 57%, and paraffin hydrocarbons 43% by weight. Other oils of these classes are numerous and have been described in the literature. The polybutadienes form a solution with this oil in which the polypropylene powder is easily and uniformly dispersed by stirring. The more useful oil-polybutadiene solutions have a density reasonably approximating that of the polypropylene powder, but mixtures more remote in density are also useful provided the potting follows the mixing before substantial decantation occurs. All problems of this type are averted by mixing the ingredients just before potting, as stratification of the polypropylene through the oil is slow in most cases and is practically nonexistent when the specific gravities of the solution and the polypropylene are similar. (3) An organic diisocyanate, preferably tolylene diisocyanate. (4) Polypropylene powder filler in particle sizes about 30 to 100 microns. (5) Preferably but not necessarily an antioxidant.

The polybutadienes of the invention are homopolymers with hydroxyl end groups which fall within the formula

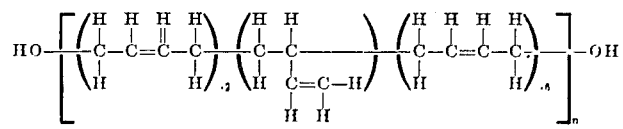

in which $n$ are repeating molecular units, $n$ being 44 to 75, those in which $n$ is 65 to 75 having a viscosity at 30° C. about 200 poises, and those in which n is 44 to 60 having a viscosity about 50 poises. For many uses the polymers of higher viscosity are preferred, but in some cases those of lower viscosity are highly satisfactory.

Among the extender oils useful in the process is a naphthenic process oil known in the trade as Tufflo 6024, but its use, while satisfactory, does not minimize the satisfactory nature of other oils of the class described above.

Polypropylene powder can be purchased on the market in fine particle sizes, for instance in sizes from 75 to 100 microns, and gives satisfactory results. The advantages which spring from its use are numerous: the product made by using it is strong, resilient light, internally cohesive, externally adhesive, readily molded or shaped, not rigid, not abrasive, of long life in mild and heavy use, and easy to work with.

Tolylene diisocyanate is on the market in technical grades of satisfactory quality.

Various antioxidants are known for use in compounds of such resinous type, among them one which is unusually satisfactory and which is called 4-4' methylene bis (2,6 ditert-butyl phenol).

An antifoaming agent is often useful, those of silicone base being sometimes of superior effect, e.g. Dow Corning Antifoam A.

The usual accelerators are useful for the cure system but dibutyl tin dilaurate has certain advantages.

The ingredients are mixed by standard techniques, the isocyanate reacts with the hydroxy-terminated homopolymeric polybutadiene, producing something structurally similar to the urethanes as a matrix within which are the microfine particles of solid polypropylene as a dispersed phase. Mixing is at room temperature in most cases.

EXAMPLE 1

A specific example of a low molecular weight, heat-cured potting compound includes 100 parts by weight dihydroxy-polybutadiene; 50 parts by weight oil lighter than kerosene, as above; 30 parts by weight microfine polypropylene powder (35 microns for example); 7 parts by weight tolylene diisocyanate; 0.5 parts by weight antioxidant.

The ioscyanates useful in this reaction are organic diisocyanates, listings of which will be found in published works and patents relating to the preparation of polyurethanes. The literature, e.g., Hostettler U.S. Pat. No. 3,169,945, describes many such isocyanates and techniques by which they may be transformed to suitable urethanes. Tolylene diisocyanate is preferred but it is representative of a large class, not exclusive. In our present example the ratio of -NCO to OH groups was about 1-1, the weight ratio of polybutadiene to tolylene diisocyanate being about 93 parts by weight to 7 parts by weight.

The polybutadiene has a viscosity from about 200 to about 50 at 30° C. In those viscosities it mixes and pours well. The diisocyanate in the above example was about 80% 2-4 and 20% 2-6, but it can be pure, or a mixture of such diisocyanates, changes in the ones chosen producing some variation in properties in the product.

In forming the blaster any suitable container is used, steel, concrete, plastic or wood for example, and the elements to be mounted are supported in their correct positions. The potting compound is then made by mixing the ingredients listed above at an appropriate temperature, for instance room temperature, or in the case of more viscous oils enough higher to produce good fluidity, e.g., 30°–40° C. The preferred potting compound pours well at room temperature, and others pour better at temperatures up to 150° C., so that the temperature will be selected according to good pouring viscosity.

In many instances the presence of bubbles in the set potting compound is not objectionable, but in other cases where a dense body is desired the blaster may be kept under vacuum, for instance at a tank pressure of 5 Torr abs., to assist in the extraction of bubbles.

After the potting the potted apparatus will be cured in the air at room temperature or at elevated temperature, e.g., in a circulating air oven. Curing time is related to temperature, being the shorter as the temperature is higher. A typical cure is 12–16 hours at 200°–225° F. Curing may be in stages, a first cure at low temperature followed by a second at high temperature, for instance up to 300° F. The cure will be stopped before degradation of the product sets in; degradation will result from the use of a temperature that is too high or from a cure that is too long. The limiting factors will be determined for each compound by test and observation. For the mode described above, 200° to 225° F. for 12 to 16 hours is satisfactory. After cure, the potting compound will operate at 240° F. for extended periods without degradation and will withstand 250° to 265° F. for shorter periods. Cooling may be in the air or forced by refrigeration. It is to be understood that curing will occur at room temperature over inordinate periods of time and that different curing temperatures have an effect not only on time but on product quality.

The reaction is self-starting and proceeds with a velocity related to the temperature of the ingredients. In general, satisfactory results are attained when the hydroxyl and isocyanate groups appear in proportions which are reactive, for instance mole for mole.

In many prior instances potting compounds have not been adherent, or have had only slight adherence, to some fillers and to some of the cases and containers used in potting, which required that some mutually adherent interlayer be interposed, but in the present invention the compound has firm adhesion to practically anything used in potting, eliminating the need for intercoats.

The cured compound in the example above has low density (about ± 0.9), which is quite important for uses requiring strength and light weight; it has excellent adhesion; is flexible even at −65° F., which is most important in polar and high elevational work; and it exceeds all normal requirements in formal uses.

EXAMPLE 2

100 parts by weight polybutadiene of the above formula, in which n is in the range 65 to 75, 70 parts by weight extender oil as above, 7 parts by weight diisocyanate, 75 parts by weight polypropylene powder in sizes of 75 to 100 microns, .5 parts by weight dibutyl tin dilaurate, 1 part by weight 4,4'-methylene bis (2,6 ditert-butylphenol), and 0.1 part by weight of silicone base antifoaming agent were mixed by dividing them into two groups of which one contained the resin base and the other the catalyst. The polybutadiene, part of the polypropylene powder, antioxidant, antifoam, part of the oil, went into the first stirred mixing pot, the second receiving the catalyst; the diisocyanate, the accelerator, and the remainder of the oil. The partition provided an equal volume ratio of base to catalyst.

The polybutadiene, oil, antioxidant, and antifoam were mixed in a clean dry vessel and blended well before adding the filler. Polypropylene powder was then added and blended in. Evacuation was employed to remove entrained air. This constituted the base component, which could be stored for days in sealed containers.

The catalyst components were mixed in a dry, clean mixing vessel, oil diisocyanate, and accelerator first, then with added polypropylene powder until a uniform mixture was produced. This component can also be stored for days in sealed containers without degradation.

In one commercial operation, the resin mixture contained 100 parts by weight polybutadiene of n 65 to 75, 10 parts by weight oil, 25 parts by weight polypropylene powder, 1 part by weight antioxidant, and 0.1 part antifoam agent. The catalyst component contained 60 parts by weight oil, 7 parts by weight tolylene diisocyanate, 0.5 parts by weight dibutyl tin dilaurate, and 50 parts by weight polypropylene powser. The two blends were stored in separate sealed containers and used as needed for potting blasters and capacitors.

In potting, the parts were mounted in correct position in the shell, measured quantities of the two components were mixed and poured into the shell to cover the instruments, in general conformity to the directions found elsewhere herein. The base component in one commercial operation was mixed 100 parts by weight with 83 parts by weight of the catalyst component. From time of pouring into the shell to gelling was about 10 minutes. The temperature employed for gelling was 86° F.

Inert ingredients such as pigments can also be used.

The techniques of mixing and potting are known to the art: Ordinary rotary mixers are satisfactory, the ingredients may be added in any order, air bubbles may be eliminated under vacuum when their presence is undesirable, the potting may take place under vacuum to increase the speed of the potting and potting may be assisted by vibration.

While the potting of blasters constitutes the specific example of this specification the compounds may be used as sound and heat insulation, and may be molded and hardened to form protective nests for apparatus in shipment. Many other uses will occur to those skilled in the potting art.

The use of catalysts to speed the reaction of isocyanates with polyols is known but it is preferred not to use catalysts in this invention because they reduce pot life.

The novel potting compounds have high elongation and are resistant to major shock, and to low and high frequency vibration over extended periods of time. It is satisfactory for light instruments and for mounting massive pieces.

Another advantage of this invention is somewhat esoteric and somewhat surprising. The microfine polypropylene particles do not interfere with the low intermolecular forces existing between the polybutadiene urethane molecules, but appear to increase the bonding force.

As many apparently widely different embodiments of the present invention may be made without departing from the spirit and scope thereof, it is to be understood that the invention is not limited to the specific embodiments.

What is claimed is:

1. A pourable potting composition comprising a hydroxyl-terminated homopolymeric butadiene having the formula

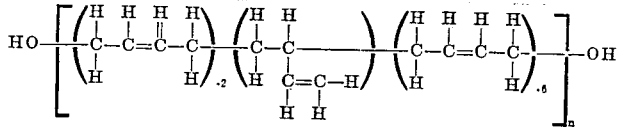

in which n is from 44 to 75 repeating molecular units, having a nominal viscosity of about 50 to about 200 poises, in solution in an extender oil which forms a solution with said homopolymeric butadiene, an organic diisocyanate dissolved in said extender oil, microfine polypropylene powder having a size from about 30 microns to about 100 microns dispersed in said extender oil and being insoluble in said oil, and an accelerator, the proportions of said homopolymeric butadiene, organic diisocyanate and extender oil being such that the mixture is pourable and self-curing to a solid state and the weight of the solid polypropylene being at least 30 percent by weight of the homopolymeric butadiene and not substantially exceeding 75 percent of the weight of the butadiene.

2. A composition according to claim 1 in which n is from 44 to 60, the viscosity is not substantially over 100 poises at 30° C., and the diisocyanate is from the class of tolylene diisocyanates.

3. A composition according to claim 1 in which n is from 65 to 75, the viscosity is substantially above 100 poises and not substantially more than 200 poises at 30° C., and the diisocyanate is from the class of tolylene diisocyanates.

4. A composition according to claim 1 in which the diisocyanate is from the class of tolylene diisocyanates, the extender oil is from the class of mineral oils lighter than kerosene fractions, naphthenic oils, and paraffin oils.

5. A composition according to claim 4 including an antioxidant, a silicone base antifoam, and dibutyl tin dilaurate as the accelerator.

6. A potting composition according to claim 1 in which there are 100 parts by weight of the homopolymeric butadiene, 50 to 70 parts by weight of the extender oil, and about 7 parts by weight of the diisocyanate and 30 to 75 parts by weight of polypropylene powder.

7. A potting composition according to claim 1 in which there are 100 parts by weight of dihydroxypolybutadiene, 50 parts by weight of an extender oil lighter than kerosene, about 7 parts by weight of tolylene diisocyanate and 30 parts by weight of the polypropylene powder.

8. A potting composition according to claim 1 in which a solution of 100 parts by weight of homopolymeric butadiene and 10 parts by weight of extender oil having 25 parts by weight of polypropylene powder dispersed therein, is blended with a solution of 7 parts by weight of tolylene diisocyanate in 60 parts of extender oil having 50 parts by weight of polypropylene powder dispersed therein to form the potting composition.

9. A pourable potting composition comprising a hydroxyl-terminated homopolymeric butadiene having the formula

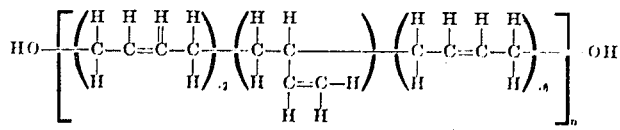

in which n is from 44 to 75 repeating molecular units, having a nominal viscosity of about 50 to about 200 poises, in solution in an extender oil which forms a solution with said homopolymeric butadiene, an organic diisocyanate dissolved in said extender oil, microfine polypropylene powder having a size from about 30 microns to about 100 microns dispersed in said extender oil and being insoluble in said oil, and an accelerator, the proportions of said homopolymeric butadiene, organic diisocyanate and extender oil being such that there are 100 parts by weight of homopolymeric butadiene, 50 to 70 parts by weight extender oil, 7 parts by weight diisocyanate, and 75 parts by weight polypropylene powder.

10. A composition according to claim 9 in which n of the polybutadiene is between 65 and 75.

* * * * *